United States Patent [19]

Pantev

[11] Patent Number: 4,784,514

[45] Date of Patent: Nov. 15, 1988

[54] SPACIAL JOINT FOR PARTS

[75] Inventor: Georgi B. Pantev, Sofia, Bulgaria

[73] Assignee: SP "Bulgarska Philatelia I Numizmatika", Sofia, Bulgaria

[21] Appl. No.: 47,820

[22] Filed: May 7, 1987

[51] Int. Cl.[4] .............................................. B25G 3/36
[52] U.S. Cl. .................................. 403/391; 403/400; 403/394
[58] Field of Search ............... 403/400, 385, 394, 391

[56] References Cited

U.S. PATENT DOCUMENTS 1,931,400  10/1933  Williams ............................. 403/385
2,942,898  6/1960  Matthysse .......................... 403/385

FOREIGN PATENT DOCUMENTS

765287  3/1934  France ............................. 403/385
434227  4/1948  Italy ............................... 403/394
486900  11/1953  Italy ............................... 403/400

Primary Examiner—Andrew V. Kundrat
Attorney, Agent, or Firm—Klein & Vibber

[57] ABSTRACT

The invention relates to a spacial joint for parts, which will find application in the lighting, building and trade industries. The present invention provides a spacial joint for quick and precise joining of parts with no possibility of turning them, which will ensure stability of the spacial disposition of the parts. The joint includes two shells with clamping beds and a mating edge formed therein, the shells being fixed one to the other through joining elements. Each shell has at least two annularly disposed beds, and on the mating edge of each bed is formed a bevelled edge, an engaging projection, and an inclined opening through which a joining element such as a bolt may pass.

6 Claims, 14 Drawing Sheets

SPACIAL JOINT FOR PARTS

BACKGROUND OF THE INVENTION

The invention relates to a spacial joint for joining two or more parts, which will find application in the light, building and trade industries for joining tubular members and flat members for example.

A known spacial joint for cylindric parts is disclosed in Bulgarian Author's Certificate BG 40905. The known joint consists of two equal in form parts, fixed through joining elements. One side of each of the equal parts ends with a dowel, the other side ends with an adjustable opening, and the middle portion is formed as a semicylindric bed.

Disadvantages of the known spacial joint include the necessity of centering the equal parts one towards the other, as well as in the possibility of unwanted turning the joined parts one to the other.

It is an object of the present invention to create a spacial joint for quick and precise joining of parts with no possibility of turning them, which will ensure stability of the spacial disposition of the parts.

SUMMARY OF THE INVENTION

The present invention provides a spacial joint for parts, comprising two shells with beds formed therein, said shells being fixed one to the other through joining elements, where each shell comprises at least two angularly disposed beds, on the mating edge of the two beds there being formed a bevelled edge and an engaging projection, an inclined opening being made therebetween for a joining element.

BRIEF DESCRIPTION OF THE DRAWINGS

With these and other objects in view, which will become apparent in the following detailed description, the present invention, which is shown by example only, will be clearly understood in connection with the accompanying drawing, in which.

DESCRIPTION OF THE PREFERRED EMBODIMENTS

Figure 1:
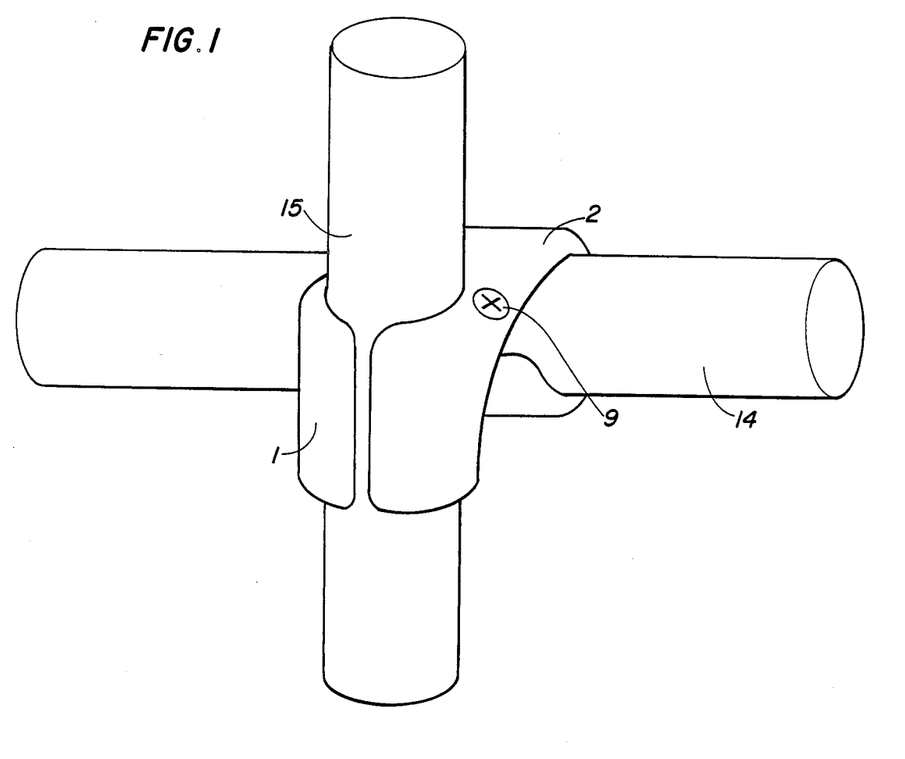
FIG. 1 is a perspective view of the general appearance of the spacial joint.
Figure 2:
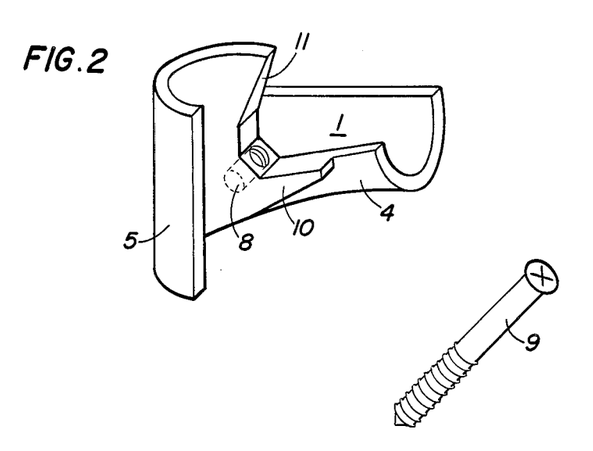
FIG. 2 is a perspective view of one of the shells of the spacial joint shown in FIG. 1.
Figure 3:
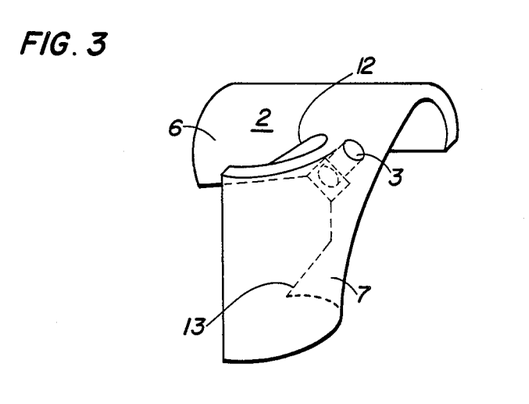
FIG. 3 is a perspective view of the other shell of the spacial joint shown in FIG. 1.
Figure 3A:
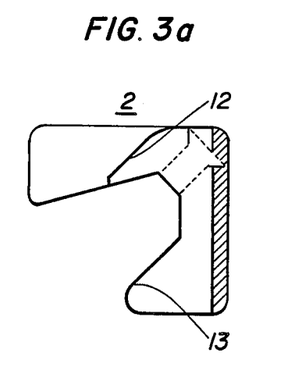
FIG. 3a is an axonometric view similar to FIG. 5, but of the shell of FIG. 3.
Figure 4:
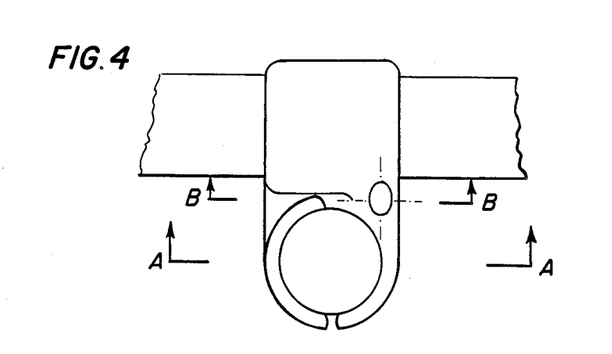
FIG. 4 is a side elevational view of the spacial joint shown in FIG. 1.
Figure 5:
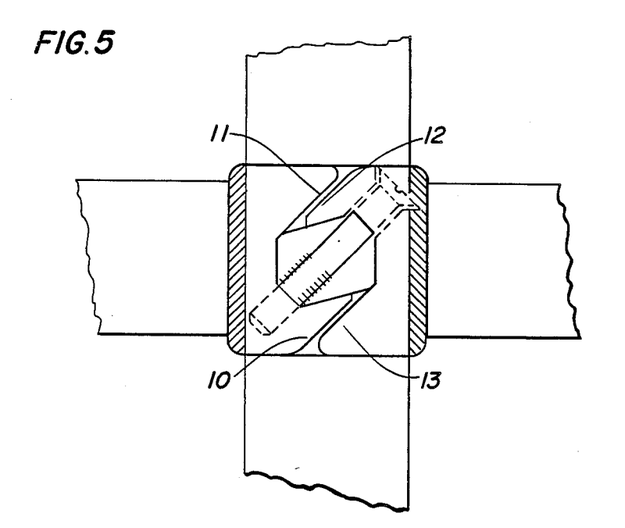
FIG. 5 is an A—A section of FIG. 4.
Figure 6:
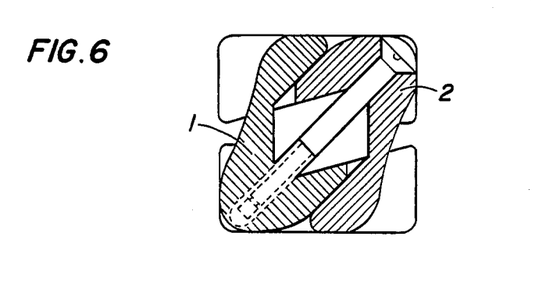
FIG. 6 is a B—B section of FIG. 4.

Referring first to FIGS. 1-6, the spacial joint according to the invention comprises two shells 1 and 2 and a joining element 9, each of the shells 1 and 2 comprising at least two beds spacially angularly disposed: 4, 5 in shell 1 and 6, 7 in shell 2. On the mating edge of beds 4 and 5 there are formed a beveled edge 11 and an engaging projection 10, and on the mating edge of beds 6 and 7 there are formed a beveled edge 13 and engaging projection 12. Upon joining the two shells 1 and 2, beveled edge 11 of shell 1 contacts the engaging projection 12 of shell 2 and beveled edge 13 of shell 2 contacts the engaging projection 10 of shell 1. Between beveled edge 11 and engaging projection 10 of shell 1 there is formed an inclined opening 8, and between beveled edge 13 and engaging projection 12 of shell 2 there is formed an inclined opening 3. Said openings 3 and 8 are coaxial and a joinint element 9 passes therethrough as can be best seen in FIGS. 5 and 6. FIG. 3a and FIG. 5 show that shells 1 and 2 are identical insofar as the engaging projection and beveled edge are shaped in the same way on each of the mating shells; shells 1 and 2 can be identical in every respect. When the joining element (e.g. screw) is tightened, bed 4 of shell 1 and bed 6 of shell 2 are moved towards each other; and bed 5 of shell 1 and bed 7 of shell 2 are also moved towards each other. Beveled edge 11 of shell 1 slides along engaging projection 12 of shell 2 while beveled edge 13 of shell 2 slides along engaging projection 10 of shell 1. As can be seen in the figures, the engaging projections and the beveled edges are designed so that their mating surfaces are parallel to the axis of the joining element 9. As the joining element 9 is tightened, forces are exerted on the mating surfaces effecting an engaging wedging of the shells and a gripping of the elements (14 and 15 in FIG. 1) held by the beds 4, 6 and 5, 7. This rigidly centers the elements of the spacial joint and allows for the functional compactness of the invention.

Figure 7:
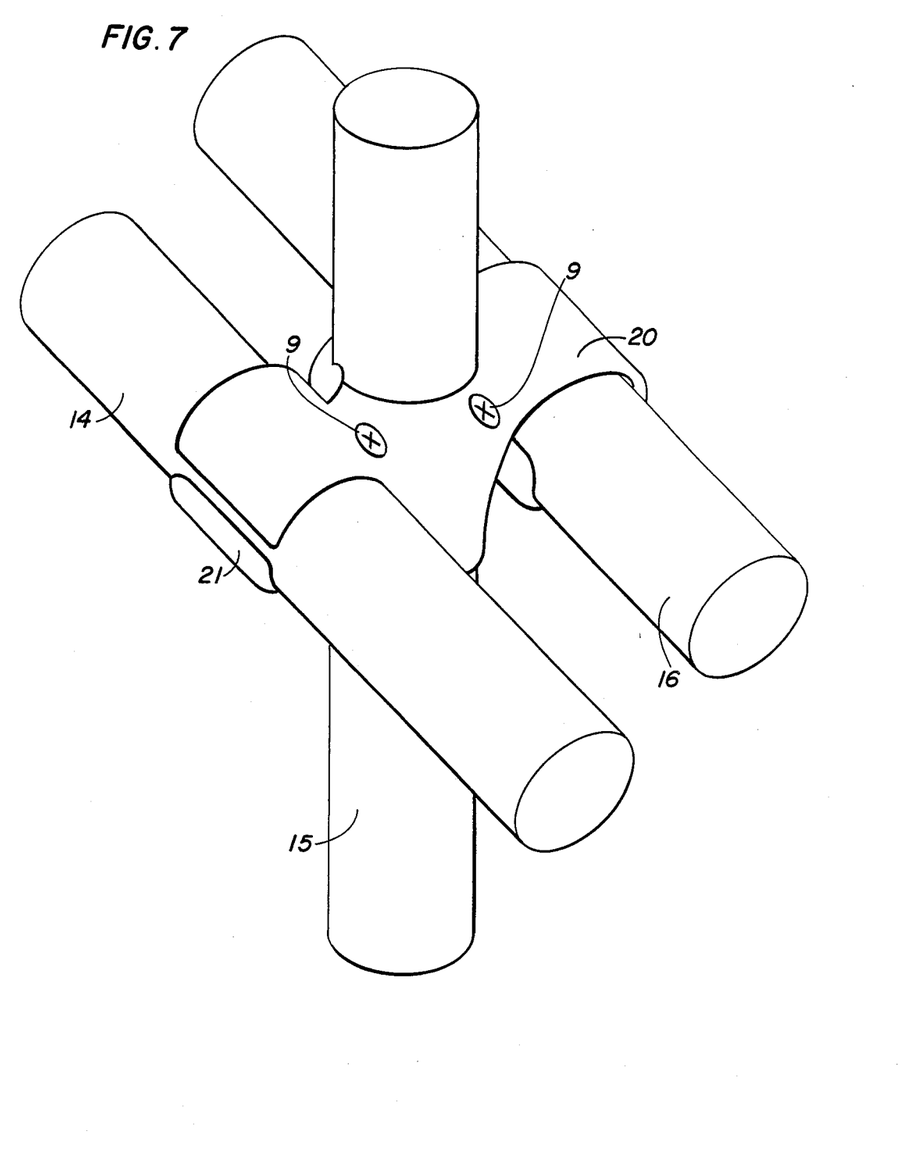
FIG. 7 is a perspective view of a spacial joint for three parts with semicylindric beds formed in its shells.

In a first variant of the spacial joint according to FIG. 7, there is shown the joining of three cylindric parts 14, 15, and 16, where the shells 20 and 21 are formed with three semicylindric beds.

Figure 8:
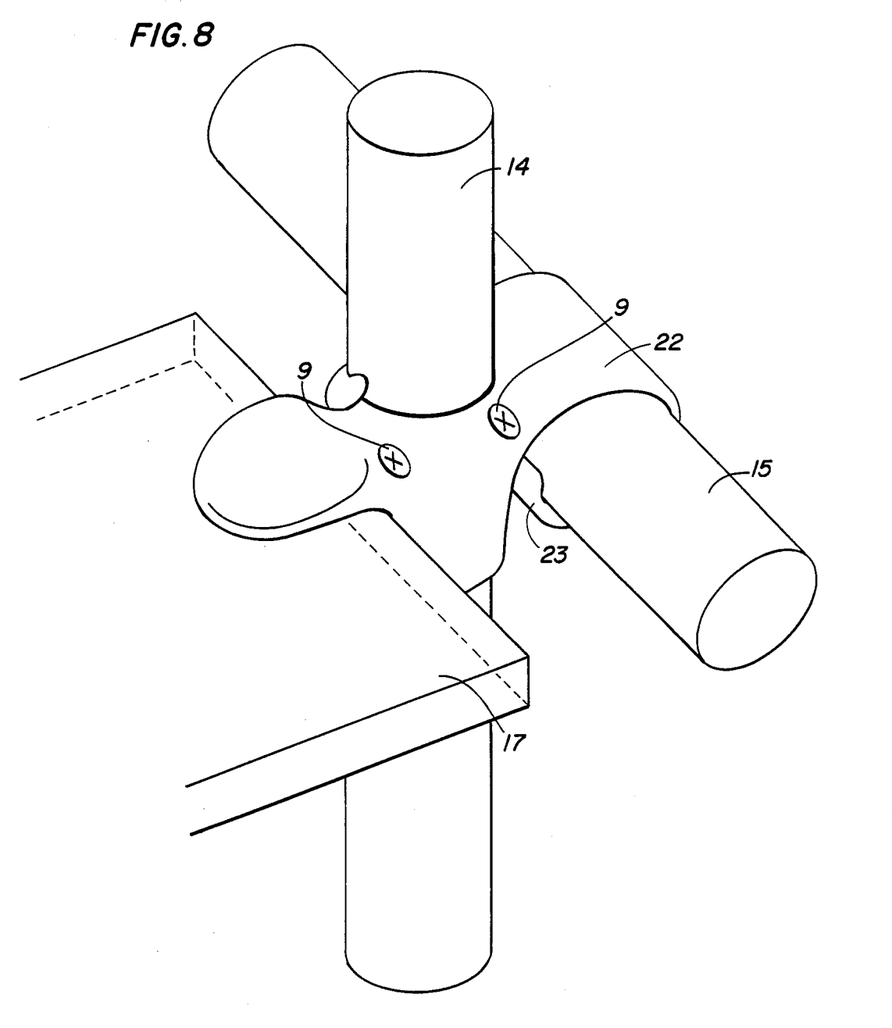
FIG. 8 is a perspective view of a spacial joint for three parts with semicylindric and flat-pressing beds formed in its shells.

In a second variant of the spacial joint according to FIG. 8, there is shown the joining of three parts—two cylindric 14, 15 and one flat part 17, where the shells 22 and 23 are formed with two semicylindric and one flat-pressing bed.

Figure 9:
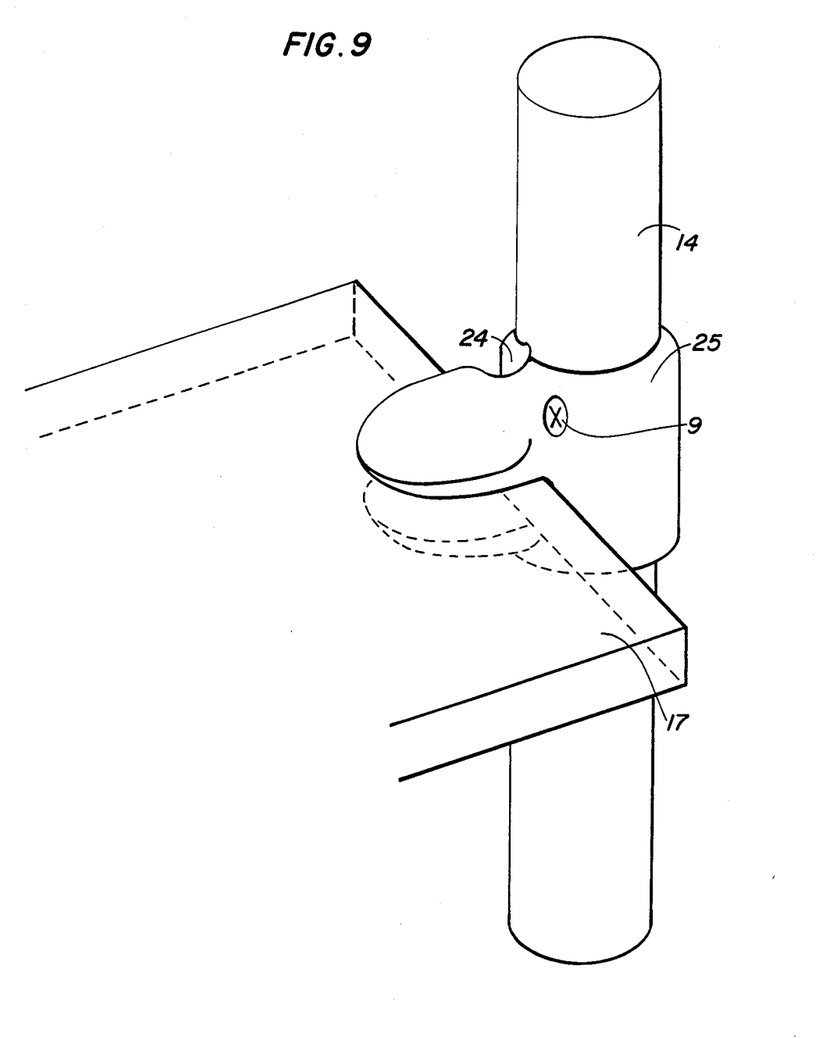
FIG. 9 is perspective view of a spacial joint for two parts with semicylindric and flat-pressing beds formed in its shells.

In a third variant of the spacial joint according to FIG. 9, there is shown the joining of two parts 14 and 17, one of which (14) is cylindric and the other (17) is flat, where the shells 24 and 25 are formed with one semicylindric and one flat-pressing bed.

Figure 10:
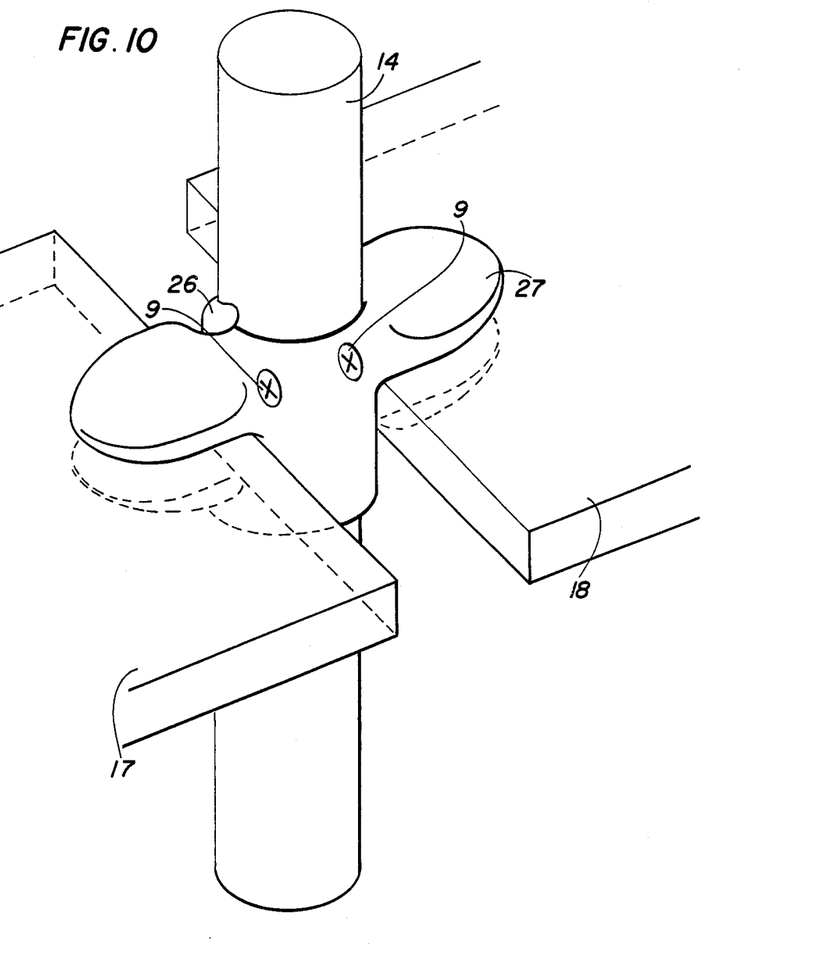
FIG. 10 is a perspective view of a spacial joint for three parts with semicylindric and flat-pressing beds formed in its shells.

A fourth variant of the spacial joint according to FIG. 10, shows the joining of three parts 14, 17, and 18, two of which (17, 18) are flat and the third (14) is cylindric, where the shells 26 and 27 are formed with two flat-pressing and one semicylindric bed.

Figure 11:
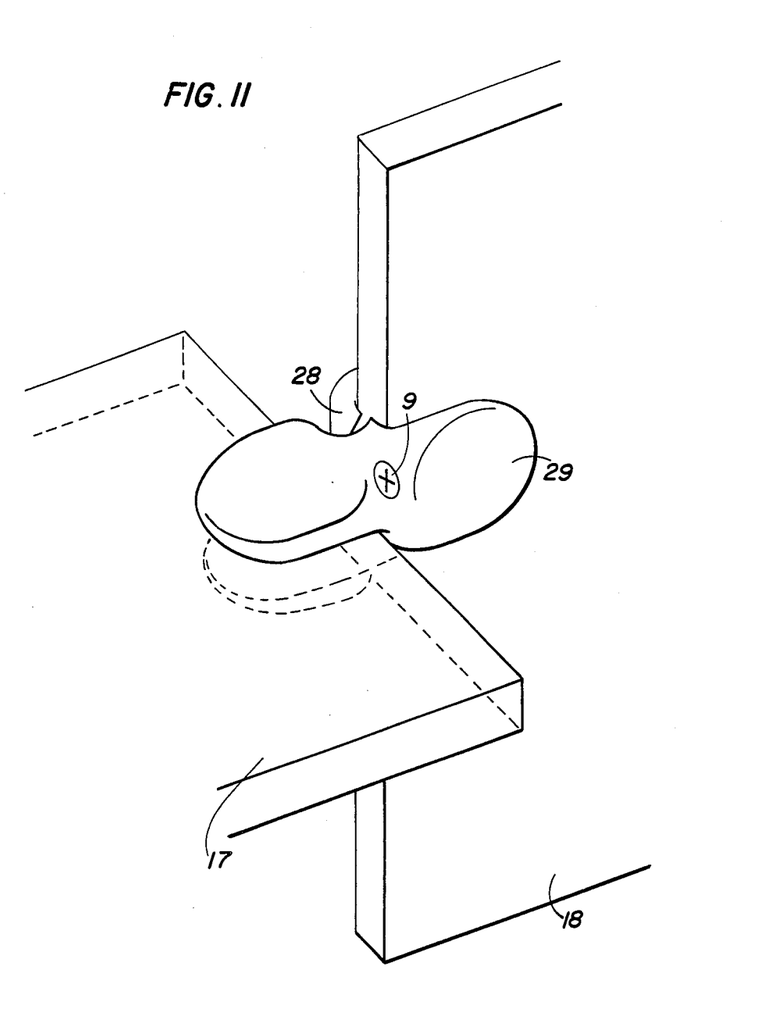
FIG. 11 is perspective view of a spacial joint for two parts with flat-pressing beds formed in its shells.

A fifth variant of the spacial joint according to FIG. 11, shows the joining of two flat parts 17 and 18, where the shells 28 and 29 are formed with two flat-pressing beds.

Figure 12:
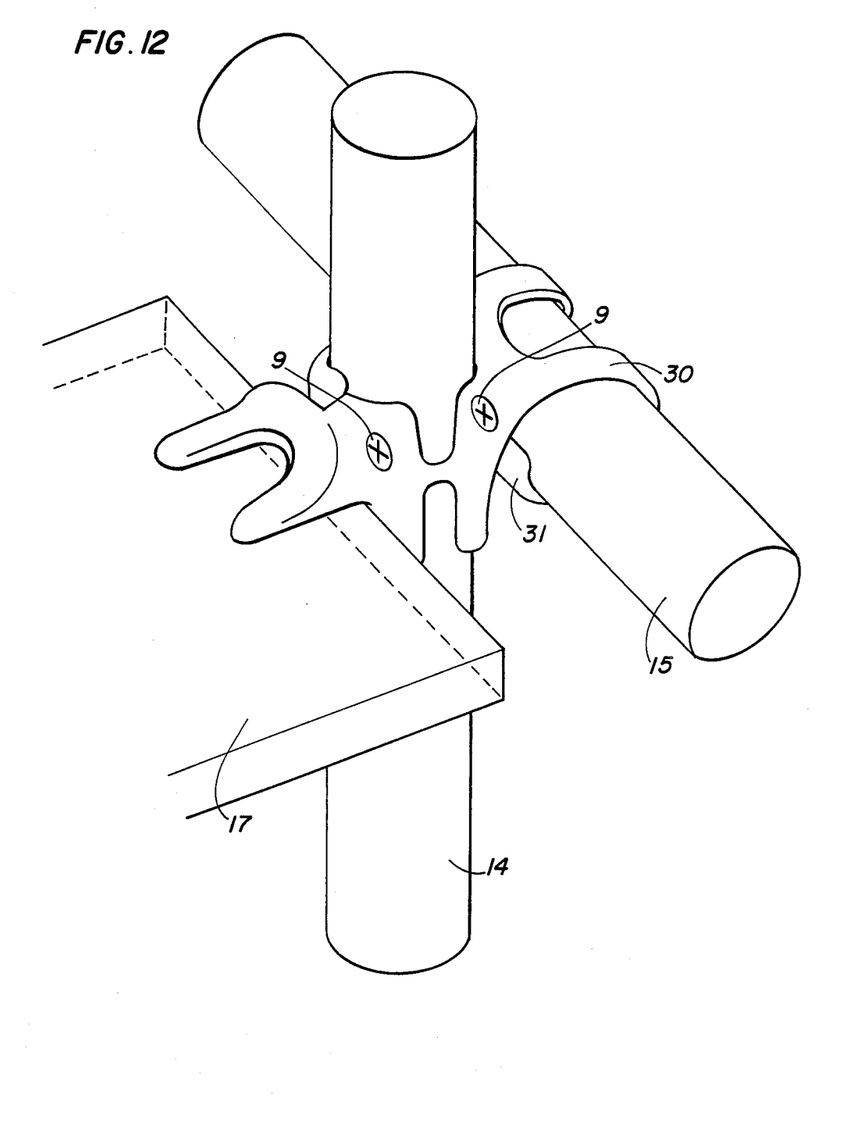
FIG. 12 is perspective view of a spacial joint for three parts with beds having a simplified constructive form, said beds being formed in the shells.

A sixth variant of the spacial joint according to FIG. 12, shows the joining of three parts 14, 15, and 17, two of which are cylindric (14, 15) and the third is flat (17), where the shells 30 and 31 have a simplified constructive form.

Figure 13:
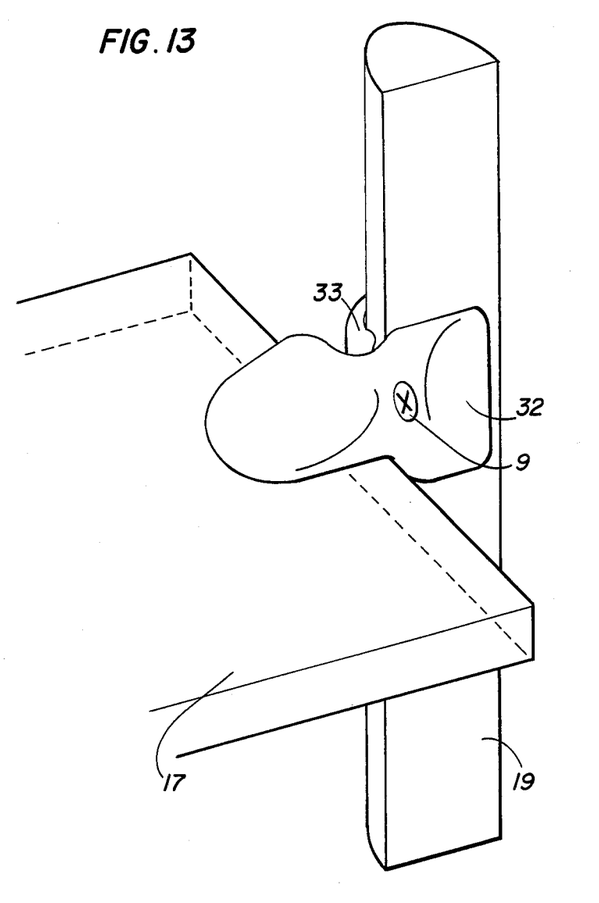
FIG. 13 is a perspective view of a spacial joint for two parts with different shells and beds.

A seventh variant of the spacial joint according to FIG. 13, shows the joining of two parts 17 and 19, where the shells 32 and 33 are formed in a different manner—shell 32 is formed with two flat-pressing beds, while shell 33 is formed with one semicylindric and one flat-pressing bed.

Figure 14:
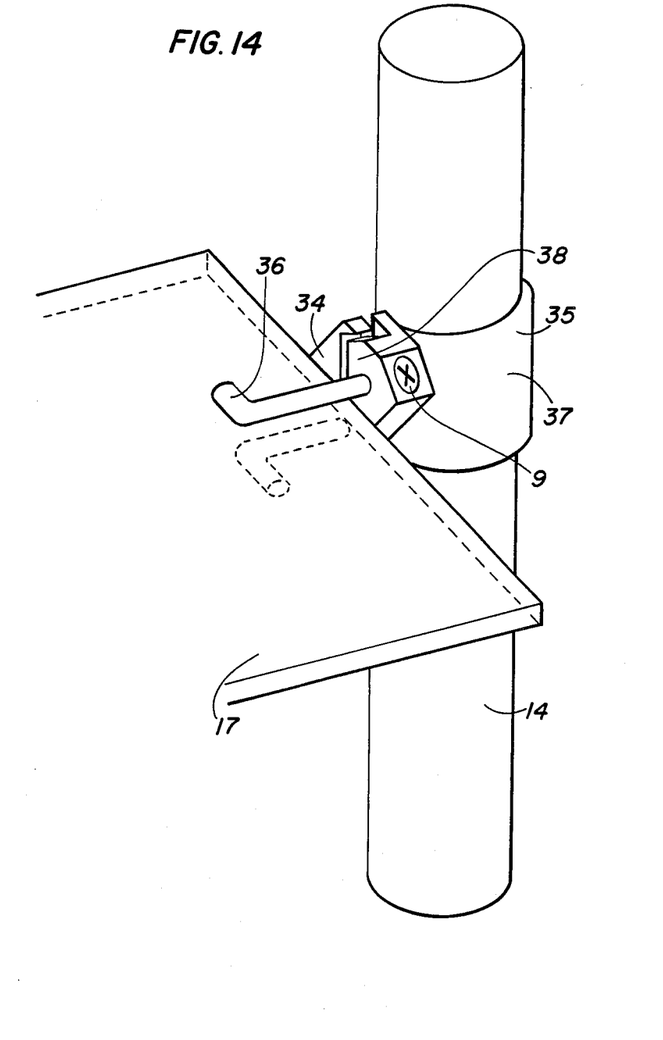
FIG. 14 is a perspective view of a spacial joint for three parts with shells and a mating edge made as independent elements.

An eighth variant of the spacial joint according to FIG. 14, shows the joining of two parts 14 and 17, where the shells 34 and 35 are formed as independent sectional elements 36, 37, and 38, the element 38 playing the role of a mating edge of the pressing beds in the elements 36 and 37 and being formed with a beveled edge and an engaging projection.

Figure 15:
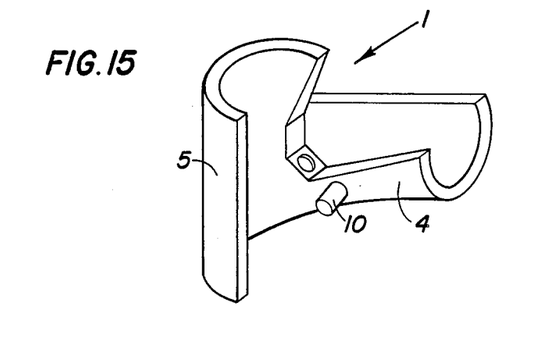
FIG. 15 is a view similar to FIG. 2, showing a variant of the engaging projection of the invention.
Figure 16:
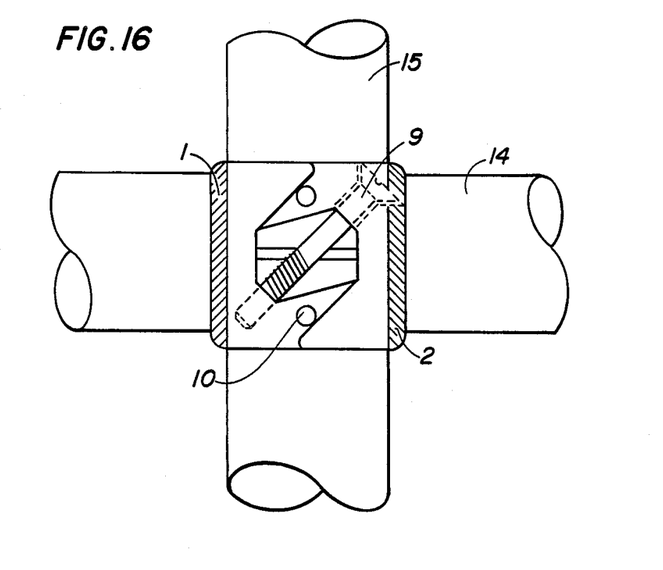
FIG. 16 is a view similar to FIG. 5, but showing the variant of FIG. 15.

FIGS. 15 and 16 show a variant of the spacial joint of the invention where the engaging projection 10 is formed as a part, e.g. a pin, that can be mounted additionally and fixed immovably to the mating edge of beds 4 and 5.

Figure 17:
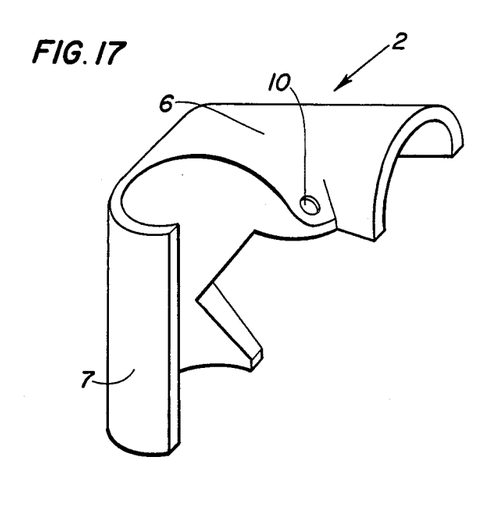
FIG. 17 is a view similar to FIG. 15, showing another variant of the engaging projection of the invention.
Figure 18:
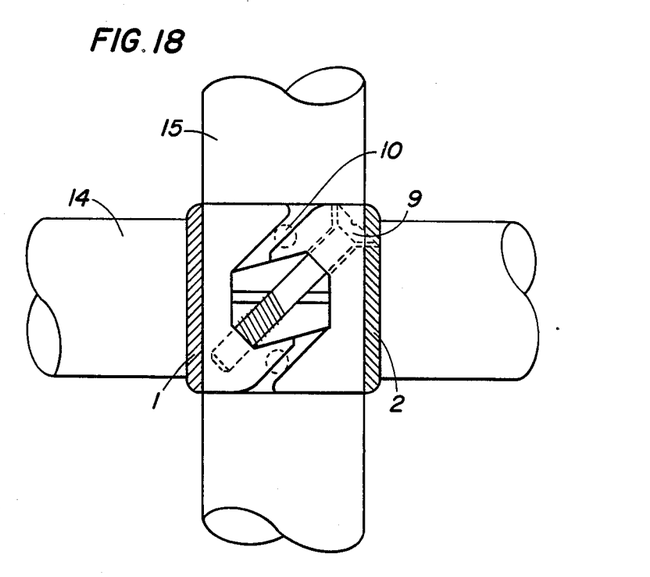
FIG. 18 is a view similar to FIG. 16, but showing the variant of FIG. 17.

In another variant, as shown in FIGS. 17 and 18, the engaging projection 10 can be formed as a ball movably mounted on bearings in a socket made in the mating edge of beds 4 and 5. Ball 10 can be added to the engaging projection to reduce friction against the beveled edge during tightening of joining element 9.

Referring once again to FIGS. 1-6, the assembly of the spacial joint can be seen in the following manner: The part 14 is placed in beds 4 and 6, and the part 15 is placed in beds 5 and 7. Thereupon, through screwing the bolt 9, the beds 4 and 6 press the part 14 and the beds 5 and 7 press the part 15, and at the same time engaging projection 12 of shell 2 slides along the beveled edge 11 of shell 1 thus realizing the necessary wedge of the functional compactness of the spacial joint.

The assembly of the variants acording to FIGS. 7, 8, 9, 10, 11, 12, 13, and 14 is carried out in essentially the same manner as described in the main variant (FIGS. 1-6), the only differences being apparent to those of ordinary skill in the art from a reading of the foregoing description.

The spacial joint is useful for building up constructions for furniture, exhibition, decorative, and advertising materials, shop windows, illuminants, scaffolds, etc. The joint shells may be made of different materials depending on its functional application, e.g. metal, plastic, etc. The beds formed in the shells of the spacial joint are made with a pressing surface, the form of which corresponds to the surface of the clamping place of the parts being joined.

Depending on the application and the aesthetic requirements, the shells can be formed in various manners in pairs as well as each for itself. In the variant where independent sectional elements are used, there can be mounted to the mating edge beds of different form and size, which are suitable for joining the corresponding parts. The mating edge of the spacial joint can also be made as a common body with one of the beds, the other bed being independently joined thereto.

The spacial joint can be manufactured by casting, punching, etc. The technology is determined by its functional designation and the aesthetic requirements to the form.

Although the invention is described and illustrated with reference to a plurality of embodiments thereof, it is to be expressly understood that it is in no way limited to the disclosure of such preferred embodiments but is capable of numerous modifications within the scope of the appended claims.

I claim:

1. A spacial joint for joining two or more parts comprising
   two mating shells, each shell having at least two spacially angularly disposed members,
   said members providing a clamping surface for engagement with a surface of the parts to be joined,
   each shell being provided with a common mating edge between said members and on which there is formed a beveled edge portion and an engaging projection and an inclined opening through which a joining element may pass so as to join the two shells in mating relationship thereby engaging the projection of one shell with the beveled edge portion of the other shell and providing joining pressure on said clamping surface with respect to the surface of the parts to be joined.

2. A spacial joint, as claimed in claim 1, wherein said members are formed with said clamping surface complementary to the surface of the parts to be joined.

3. A spacial joint, as claimed in claim 1, wherein said engaging projection is formed as an integral part of said shell.

4. A spacial joint, as claimed in claim 1, wherein said engaging projection is formed as an additional sectional element, immovably fixed on the common mating edge of the shell.

5. A spacial joint, as claimed in claim 1, wherein the engaging projection is formed as a ball, movably placed on bearings in a socket made in the common mating edge of the shell.

6. A spacial joint, as claimed in claim 1, wherein the said common mating edge of the shell with the bevelled edge, the engaging projection and the inclined opening is formed as an independent element.

* * * * *